(12) United States Patent
Bodke et al.

(10) Patent No.: US 8,707,085 B2
(45) Date of Patent: Apr. 22, 2014

(54) HIGH AVAILABILITY DATA STORAGE SYSTEMS AND METHODS

(75) Inventors: Manohar Rao Bodke, Hyderabad (IN); Lakshmi Priya Kanduru, Hyderabad (IN); Rohit Krishna Prasad, Cedar Park, TX (US); Ravi A. Shankar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 13/173,681

(22) Filed: Jun. 30, 2011

(65) Prior Publication Data

US 2013/0007504 A1 Jan. 3, 2013

(51) Int. Cl.
*G06F 11/00* (2006.01)

(52) U.S. Cl.
USPC .............................................. 714/4.11; 714/43

(58) Field of Classification Search
USPC .................... 714/4.11, 6.3, 6.31, 6.32, 6.2, 43
See application file for complete search history.

(56) References Cited

U.S. PATENT DOCUMENTS

| | | | |
|---|---|---|---|
| 6,526,521 B1 * | 2/2003 | Lim ................................ | 714/4.4 |
| 6,952,734 B1 * | 10/2005 | Gunlock et al. ............... | 709/227 |
| 7,093,155 B2 * | 8/2006 | Aoki ............................. | 714/4.11 |
| 7,305,591 B2 * | 12/2007 | Do et al. ........................ | 714/43 |
| 7,379,990 B2 | 5/2008 | Tsao | |
| 7,788,453 B2 | 8/2010 | Boyd et al. | |
| 7,792,923 B2 * | 9/2010 | Kim ............................... | 709/218 |
| 7,830,786 B2 | 11/2010 | Atlas et al. | |
| 8,122,120 B1 * | 2/2012 | Athreya et al. ............... | 709/224 |
| 2003/0126315 A1 * | 7/2003 | Tan et al. ........................ | 710/1 |
| 2004/0267980 A1 * | 12/2004 | McBrearty et al. ............ | 710/38 |
| 2006/0015680 A1 * | 1/2006 | Otsuka et al. ................ | 711/111 |
| 2006/0117212 A1 * | 6/2006 | Meyer et al. .................. | 714/4 |
| 2006/0161810 A1 | 7/2006 | Bao | |

\* cited by examiner

*Primary Examiner* — Yolanda L Wilson

(74) *Attorney, Agent, or Firm* — Schmeiser, Olsen & Watts, LLP

(57) ABSTRACT

Provided are systems and methods for accessing a storage device from a node when a local connection failure occurs between the node and the storage device. A failure is determined to have occurred at a first node access path between a first node and a storage device that prevents an application at the first node from accessing the storage device from the first node access path. An access request is sent from the first node to a second node. The second node has a second node access path to the storage device. A determination is made that the second node can communicate with the storage device. The storage device is accessed by an application at the first node via the second node access path.

20 Claims, 7 Drawing Sheets

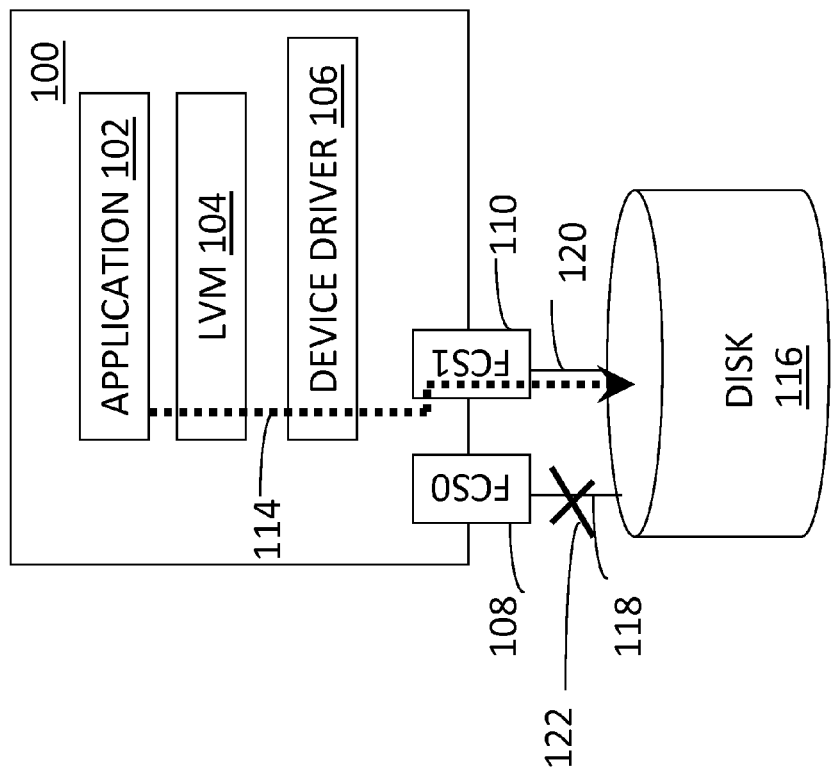
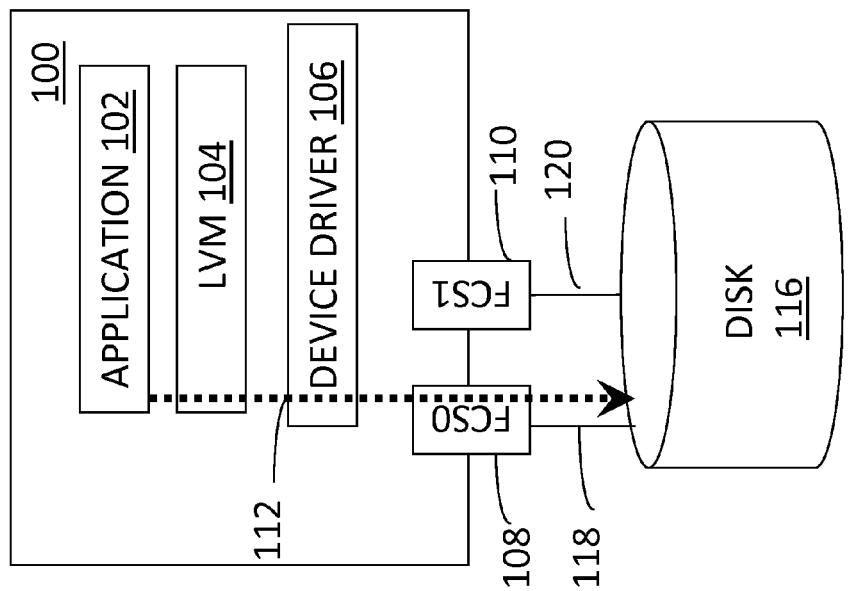
FIG. 1B
FIG. 1A

HIGH AVAILABILITY DATA STORAGE SYSTEMS AND METHODS

TECHNICAL FIELD

The present inventive concepts relate generally to data storage systems, and more specifically to systems and methods for accessing a data storage device in a high availability configuration.

BACKGROUND

Modern storage systems are commonly employed for storing large amounts of data for easy and fast access. There is a general requirement that data storage systems include a high level of reliability and availability, especially when critical applications provide a high availability service, such as "software as a service" or SaaS, to an organization's users or customers. Despite the rapid evolution in storage technology, computer networks, and software applications, a data storage system can nevertheless experience hardware or software failures.

A typical configuration for ensuring data availability includes a cluster arrangement, where two or more redundant computer servers, referred to as nodes, run application programs that access data stored on a disk, storage subsystem, or other storage-related device shared by the nodes, for example, Redundant Array of Independent Disk (RAID) arrays. High availability can be achieved by configuring two nodes to communicate with each other and with the shared disk array via an IP network. Redundant hardware arranged in a cluster configuration can eliminate a single point of failure and ensure that, in the event of a hardware failure, an application and its data are accessible. For example, if one node with a critical application crashes, then the application can be restarted on the other node.

BRIEF SUMMARY

In one aspect, a computer-implemented method is provided for accessing a storage device from a node when a local connection failure occurs between the node and the storage device. The method comprises determining that a failure has occurred at a first node access path between a first node and a storage device that prevents an application at the first node from accessing the storage device from the first node access path. The method further comprises sending an access request from the first node to a second node, the second node having a second node access path to the storage device. The method further comprises determining that the second node can communicate with the storage device. The method further comprises accessing the storage device by an application at the first node via the second node access path.

In another aspect, a computer-implemented method is provided for redirecting data flow to an access path between a node and a storage device. The method comprises forming a data path redirection module on a first node. The method further comprises forming a data path redirection receiver on a second node. The method further comprises configuring the data path redirection module with access information related to a storage device. The method further comprises establishing an alternative data path between the first node, the second node, and the storage device according to the access information so that an application at the first node can exchange data with the storage device via the second node.

In another aspect, a storage system comprises a first node, a second node, a storage device, a primary path, and an alternative data path. The first node includes a data path redirection module and an application. The second node includes a data path redirection receiver. The storage device is in communication with at least one of the first node and the second node. The primary data path is between the first node and the storage device. The alternative data path is between the first node, the second node, and the storage device, wherein data is exchanged between the application at the first node and the storage device along the alternative data path in response to a failure at the primary data path.

In another aspect, a computer program product is provided for accessing a storage device from a node when a local connection failure occurs between the node and the storage device. The computer program product comprises a computer readable storage medium having computer readable program code embodied therewith. The computer readable program code comprises computer readable program code configured to determine that a failure has occurred at a first node access path between a first node and a storage device that prevents an application at the first node from accessing the storage device from the first node access path. The computer readable program code further comprises computer readable program code configured to an access request from the first node to a second node, the second node having a second node access path to the storage device. The computer readable program code further comprises computer readable program code configured to determine that the second node can communicate with the storage device. The computer readable program code further comprises computer readable program code configured to access the storage device by an application at the first node via the second node access path.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 1A is a block diagram of a network environment illustrating a node having redundant access paths to a disk;

FIG. 1B is a block diagram of the network environment of FIG. 1A illustrating an access path failure;

DETAILED DESCRIPTION

Figure 2:
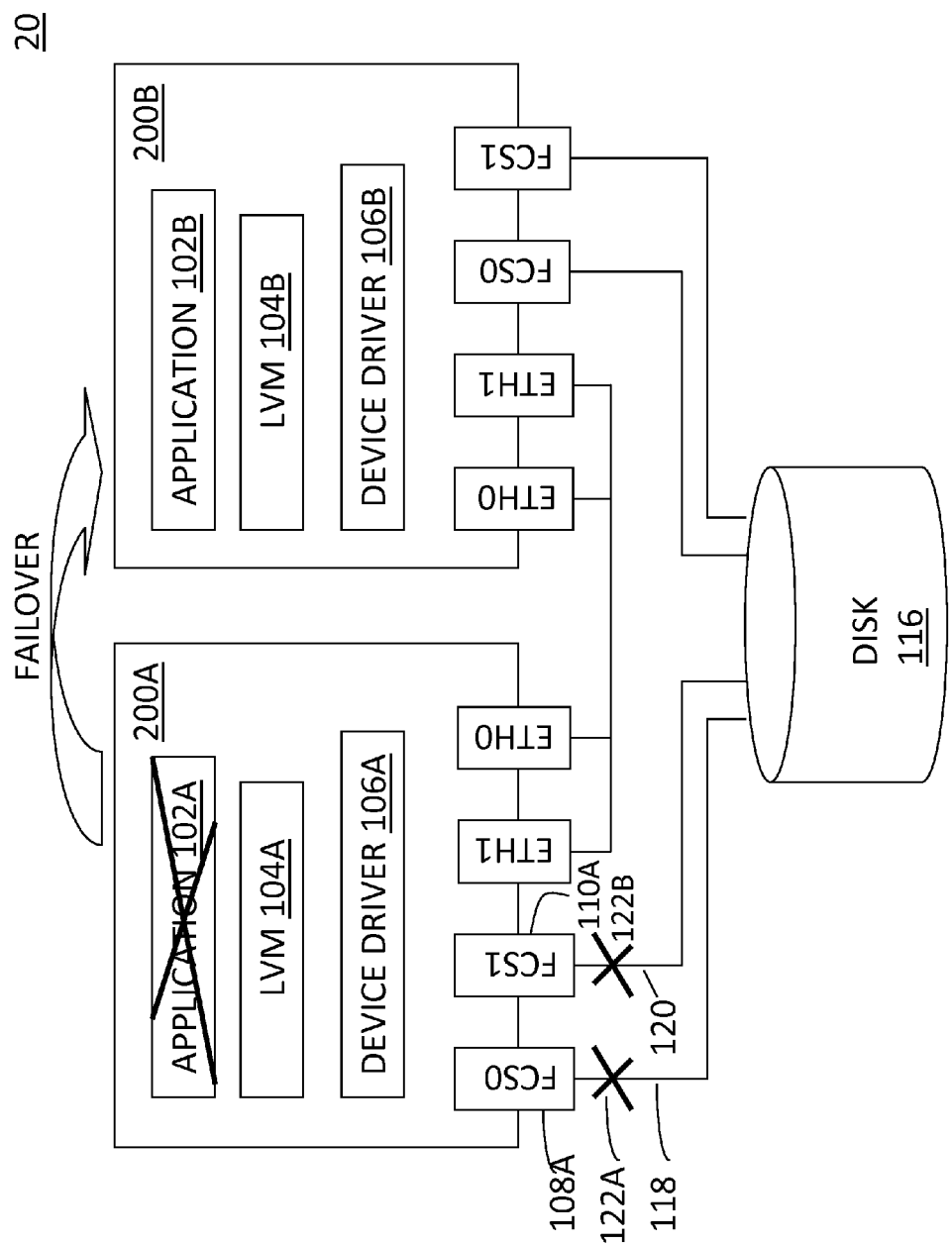
FIG. 2 is a block diagram of a conventional two-node cluster.

In the following description, specific details are set forth although it should be appreciated by one of ordinary skill that the systems and methods can be practiced without at least some of the details. In some instances, known features or processes are not described in detail so as not to obscure the present invention.

FIG. 1A is a block diagram of a network environment 10 illustrating a node 100 having redundant access paths to a disk 116. FIG. 1B is a block diagram of the network environment 10 of FIG. 1A illustrating an access path failure.

The node 100 can include a first fiber channel switch (FCS0) 108 and a second fiber channel switch (FCS1) 110 configured for redundancy. FCS0 108 and FCS1 110 can be network adaptors such as S-bus adaptors when the disk 116 is configured to include a RAID mass-storage subsystem. The node 100 can alternatively include other high-speed data transfer mechanisms known to those of ordinary skill in the art for exchanging I/O commands, data, and the like with storage device such as the disk 116. A first access path 118 extends from FCS0 108 to a disk 116. A second access path 120 extends from FCS1 110 to the disk 116. The first access path 118 and/or the second access path 120 can be configured to include storage area network (SAN) links and the like. Thus, the first access path 118 and/or the second access path 120 can include other well-known devices such as a SAN switch.

The node 100 includes an application module 102 that can include one or more application programs, for example, for providing an e-commerce website, or a service. The application module 102 can transmit I/O-related information such as access requests over a data path 112 to the disk 116 during an operation. The data path 112 includes a logical volume manager (LVM) 104, and device driver 106, and FCS0 108. Functional details of the LVM 104, the device driver 106, and FCS0 108 are well-known and therefore will not be described for reasons related to brevity.

As shown in FIG. 1B, an access failure 122 occurs at the first access path 118, for example, due to a failure at FCS0 108. In response, the node 100 can form an alternative data path 114 to the disk 116 that extends from the application module 102 through FCS1 110 along the second access path 120 to the disk 116. For example, a multipath I/O (MPIO) management module (not shown) can be implemented to select the second access path 120 as part of the alternative data path 114 if an access failure 122 occurs, so that the disk 116 can be accessed via FCS1 110 and access path 120. However, if failures occur at both access paths 118, 120, then the application module 102 in the node 100 may be prevented from communicating with the disk 116. Accordingly, the application module 102 may go offline or be otherwise prevented from servicing a request.

FIG. 2 is a block diagram of a conventional two-node cluster 20. In particular, when all of the access paths 118, 120 between a first node 200A and a disk 116 experience a failure, then the application module 102A of the first node 200A cannot communicate with the disk 116 via either access path 118 or access path 120, and may consequently be taken offline or be otherwise prevented from servicing requests, for example, by a client. The first node 200A and the second node 200B can be configured for failover protection such that the disk 116 can be accessible from the second node 200B if a failure occurs at the first node 110A. Here, an application in the application module 102A can be restarted at the application module 102B of the second node 200B. However, since the application is restarted, it requires a bootstrap operation. In addition, the restarted application must recover from its previous stop point at the time of transition. This can result in a large recovery time during which the service is not available to external customers, for example, in a SaaS environment. Also, multi-site deployments can be affected where the first node 200A is located at a primary site and the second node 200B is located at a secondary site. Here, a switchover of operations from the primary site to the secondary site can be disruptive to business operations. It is therefore advantageous for customers to operate their storage servers from a single location, i.e., the primary location, wherever possible.

Embodiments of the present inventive concepts overcome the abovementioned limitations by providing storage systems and methods that provide a cluster node with access to a shared storage device, even when the access paths from the node to the disk fail so long as the application in the node is still operational. Unlike conventional approaches, the embodiments feature the delay or prevention of an application failover from a first cluster node to a second cluster node. In particular, when all of the local access paths, for example, SAN links, between the first node and the storage device are lost, an application program at the first node can transmit I/O information, access data, and the like from the storage device via an alternative data path that extends from the first node through the second node to the storage device.

In an embodiment, the systems and methods complement an IP-based replication scheme, for example, host-mediated mirroring such as geographical logical volume mirroring (GLVM). GLVM is typically implemented to provide mirroring of data between a primary storage device and a secondary data storage device. GLVM is often activated when SAN links are lost due to a server or disk failure at the location of the primary storage device. In an embodiment, GLVM is enhanced to allow for access to the storage device when the storage device itself is operational but cannot be accessed by a corresponding primary node due to SAN link failures and the like. For example, when a failure occurs at most or all access paths between a primary cluster node and a storage device, the primary node can use GLVM to initiate disk access requests over the IP network, which are directed to the remote cluster node, which in turn can access the storage device, and receive data from the storage device, via active access paths between the remote cluster node and the storage device return data. Thus, an application program at the first node can continuously access data with a minimal impact on performance.

Figure 3:
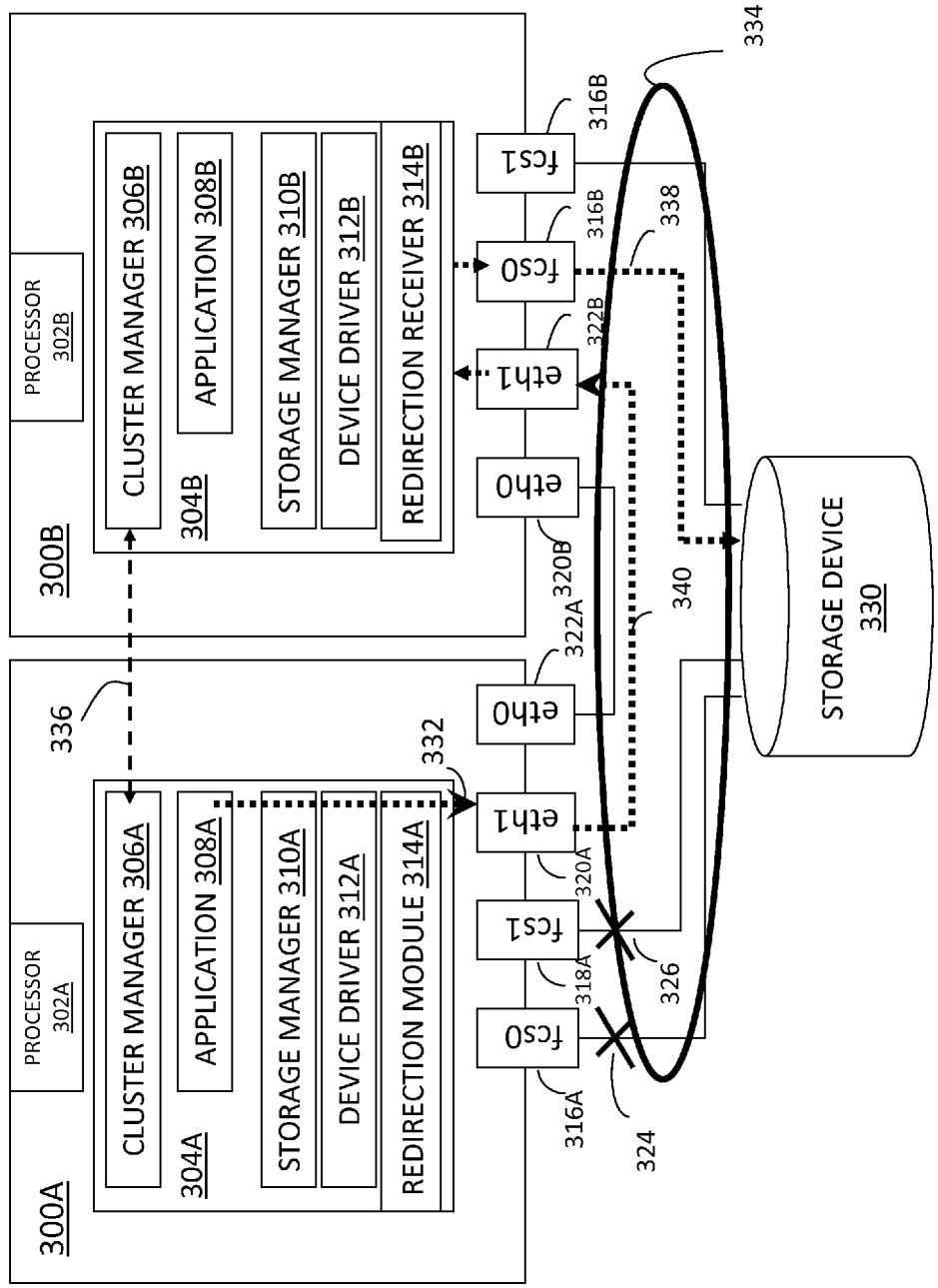
FIG. 3 is a block diagram of a network environment illustrating a first node server accessing a storage device via an alternative data path through a second node server when failures occur at the local access paths between the storage device and the first node server, in accordance with an embodiment.

FIG. 3 is a block diagram of a network environment 30 illustrating a first node server 300A accessing a storage device 330 via an alternative data path 332 through a second node server 300B when failures occur at the local access paths 324, 326 between the storage device 330 and the first node server 300A, in accordance with an embodiment. The first node server 300A, the second node server 300B, and the storage device 330 can be separated from each other and in communication with each other by a network 334, for example, an IP network. In an embodiment, the node servers 300A, 300B are arranged in a high availability node cluster.

The first node server 300A, also referred to as a host or node, includes a processor 302A, a memory 304A, a first pair of network connectors 316A, 318A, and a second pair of network connectors 320A, 322A. The first pair of network connectors 316A, 318A and the second pair of network connectors 320A, 322A can each be configured for redundancy. In an embodiment, the first pair of connectors 316A, 318A include fiber channel adaptors for connecting to the storage device 330, for example, via a SAN-related device. In another embodiment, the second pair of connectors 320A, 322A includes Ethernet adaptors for connecting via an IP network to one or more other nodes in the cluster, for example, the second node server 300B. The Ethernet adapters can be fast Ethernet adapters, 10 GB Ethernet adapters, and the like. The second pair of connectors 320A, 322A can alternatively be RS-232 connectors or other network interfacing devices for connecting to non-IP networks.

The memory 304A can store computer instructions and/or data in the form of program code corresponding to a cluster manager 306A, an application module 308A, a storage manager 310A, a device driver 312A, and a data path redirection module 314A, one or more of which can be processed by the processor 302A. The application programs 308A, the storage manager 310A, and the device driver 312A can be similar to those described above and can include additional features described below.

The application module 308A can access data stored on the attached storage device 330 via local access paths 324, 326 when at least one local access path 324, 326 is operational, or via the alternative data path 332 when the storage device 330 is inaccessible from the local access paths 324, 326. The application module 308A can include an application that is part of a software offering, SaaS offering, or other critical application program, for example, an e-commerce website.

The storage manager 310A can include a logical volume manager (LVM) module to allocate space on the storage device 330, perform host-based mirroring, for example, GLVM mirroring, and provide other features and functions known to those of ordinary skill in the art. The storage manager 310A can include a GLVM module that initiates disk access requests over the network 334. The access requests can be received by a GLVM server that is part of or separate from but in communication with the second node server 300B, which in turn communicates with the storage device 330 to process the request and return the requested data to the first node server 300A.

The device driver 312A can provide I/O communications to the storage device 330 and permit one or more connections to be established with the storage device 330. The device driver 312A can include an OS disk device driver and/or a network adapter device driver. In an embodiment, the device driver 312A includes an hdisk driver. The device driver 312A enables the storage device 330 to be visible to a user from the operating system of the node server 300A, for example, IBM AIX. The device driver 312A can provide event information to the cluster manager 306A such as a disk fail event, FC link fail event, and the like. Cluster Manager performs an appropriate action upon receiving the event that is well-known to those of ordinary skill in the art.

The cluster manager 306A manages the events and resources across a cluster when the node servers 300A and 300B are configured as a cluster. For example, the cluster manager 306A can monitor application failure events, and exchange messages with the node server 300A to coordinate any actions required in response to an event. The cluster manager 306A can include a daemon which is available on each node in the cluster to respond to unplanned events such as recovering from a hardware or software failure, for example, a disk failure or a network adapter failure. The cluster manager 306A can also communicate with the data path redirection module 314A of the first node server 300A and/or a corresponding cluster manager 306B of the second node server 300B as shown by communication path 336 between the cluster managers 306A, B, to form the alternative data path 332 to the storage device 330.

The data path redirection module 314A can include an RPV client that allows the storage manager 310A to consider a physical volume, for example, corresponding to storage device 330, located at a remote site as another local physical volume, even though the actual data I/O operations are performed at the remote site. In doing so, the RPV client can issue I/O requests corresponding to operations related to the storage device 330. When the data path redirection module 314A is activated, data such as I/O information initiated from the first node server 300A can be transferred to the second node server 300B over an IP connection, for example, between the second pair of network connectors 320A, 322A, in compliance with well-known network standards, such as Internet Small Computer System Interface (iSCSI).

The second node server 300B can have a similar configuration as the first node server 300A. In particular, the second node server 300B includes a processor 302B, a first pair of network connectors 316B, 318B, and a second pair of network connectors 320B, 322B. These elements are similar to corresponding elements described above with regard to the first node server 300A. Detailed descriptions of these elements will therefore not be repeated for reasons related to brevity. The second node server 300A also includes a memory 304B, which can include a cluster manager 306B, an application module 308B, a storage manager 310A, and a device driver 312B, each of which can be similar to corresponding components of the memory 304A of the first node server 300A. Each node server can have different hardware configurations. For example, the first node server 300A can have two network connectors and the second node server 300B can have more than two network connectors. Descriptions of these elements of the memory 304B will therefore not be repeated for reasons related to brevity.

The memory 304B also includes a data path redirection receiver 314B. The data path redirection receiver 314B can include an RPV server, which communicates with the RPV client of the redirection module 314A via at least one of the IP network connections 320B, 322B. The RPV server can accept communications from the RPV client, for example, iSCSI requests, for example, related to the formation of the alternative data path 332 for access to the storage device 330.

When the RPV server is activated, a kernel extension can be started which listens for I/O requests from the RPV client, for example, a SCSI request from the RPV client to perform a I/O operation related to the storage device 330. In response, the RPV server permits the storage device 330 to be accessed from the second node server 300B.

The storage device 330 is shared by the first node server 300A and the second node server 300B. The storage device 330 can include a storage subsystem, a disk controller such as a SAN Volume Controller (SVC), and/or other related elements for communicating with at least one of the first node server 300A and the second node server 300B.

Figure 4:
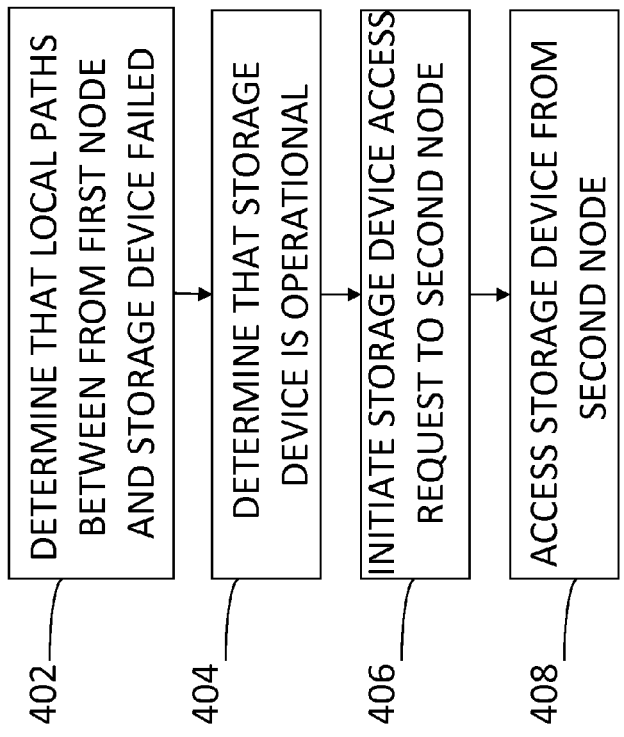
FIG. 4 is a flowchart illustrating a method for accessing a storage device, in accordance with an embodiment.

FIG. 4 is a flowchart illustrating a method 400 for accessing a local storage device, in accordance with an embodiment. In describing the method 400, reference is also made to FIG. 3. The method 400 can be governed by instructions that are stored in the memory device 304A of the first node server 300A and/or the memory device 304B of the second node server 300B, and are executed by the processor 302A of the first node server 300A and or the processor 302B of the second node server 300B.

The method 400 is preferably applied for accessing the storage device 330 when the storage device 330 is functioning properly but failures have occurred at the access paths 324, 326 between the first node server 300A and the storage device 330. Accordingly, at block 402, a determination is made that a hardware or software malfunction or error-related event has occurred, which prevents the first node server 300A from communicating with the storage device 330 via the local access paths 324, 326.

At block 404, a determination is made that the local storage device 330 is operational. This determination can be made by performing diagnostics or other high availability module configured to detect a storage device access failure. The determination can be made based on the event received by the device 330. For example, if the event received is a link down or device fail event, this indicates that the storage device 330 is functioning. A primary feature of the cluster manager 306A is to provide an alternative path to the storage device 330. The identification of an alternative path indicates, and can assume, that the storage device 330 is functioning properly. The storage device 330 can be configured and implemented such that it does require diagnostics before sending a linkdown or device fail event to the cluster manager 306A.

At block 406, a storage device access request is initiated. In an embodiment, the first node server 300A uses GLVM to generate a storage device access request that is transmitted over the network 334 to the second node server 300B. The storage device access request can include a query by the cluster manager 306A to the cluster manager 306B whether the storage device 330 is accessible from the second node server 300B. The request can include information corresponding to the storage device 330 such as a physical volume identifier (PVID), a LUN ID where the storage device 330 is a SAN device, and the like.

At block 408, the second node server 300B verifies and acknowledges to the first node server 300A that the second node server 300B can access the storage device 330, for example, via network connector 316B and/or 318B.

Figure 5:
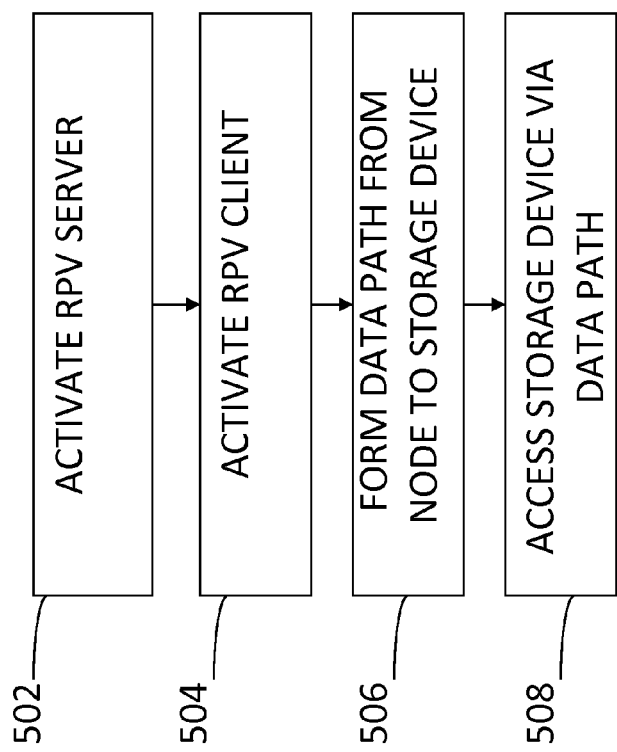
FIG. 5 is a flowchart illustrating a method for forming a data path from a first node of a cluster to a storage device, in accordance with an embodiment.

FIG. 5 is a flowchart illustrating a method 500 for forming a data path from a first node of a cluster to a storage device, in accordance with an embodiment. In describing the method 400, reference is also made to FIG. 3. The method 500 can be governed by instructions that are stored in the memory device 304A of the first node server 300A and/or the memory device 304B of the second node server 300B, and are executed by the processor 302A of the first node server 300A and or the processor 302B of the second node server 300B.

At block 502, the RPV server of the redirection receiver 314B is activated at the second node server 300B, for example, by a cluster manager. For example, PowerHA® provided by IBM, Inc. can include a system mirror that manages a node cluster and its applications. When an access path failure such as a fiber channel (FC) link failure occurs, for example, at FCS0 108 and FCS1 110, the cluster manager can monitor and track such link failures and storage device status. When a disk failure event occurs or all access paths are detected to have failed, the cluster manager can activate the RPV server. When the RPV server is activated, a kernel extension can be started, which listens for I/O requests, for example, from an application 308A requesting disk access.

At block 504, the RPV client of the redirection module 314A is activated at the first node server 300A. The cluster manager referred to above can activate the RPV client. When the RPV client 314A is formed, access information is added to the first node server configuration, more specification, configuration details regarding the access of the storage device 330 via the network 334.

At block 506, a data path 332 is formed from the first node server 300A to the second node server 300B via the LAN connection 340. The data path 332 configuration information can be added to an MPIO management module. Thus, at block 508, when failures occur at local access paths 324, 326, the MPIO management module can direct I/O requests and the like to the RPV client. The RPV client can communicate with the RPV server at the second node server 300B to process the request. In an embodiment where MPIO is not provided, I/O redirection can be handled by the disk device driver 312A and/or 312B, or other driver. The RPV server can receive these requests and perform the requested I/O operations on the storage device 330.

Thus, the method 500 can be applied to form an alternative path from the first node server 300A to the storage device 330 via the second node server 300B in the event that all links 324, 326 go down. This method 500 provides an improved approach over conventional failover operations, which occurs when all SAN links are inaccessible. Here, a high availability cluster server of one cluster node can detect the disk access failure and start the application on another cluster node, resulting in temporary downtime. The method 500 when applied prevents or delays such a failover from occurring.

Figure 6:
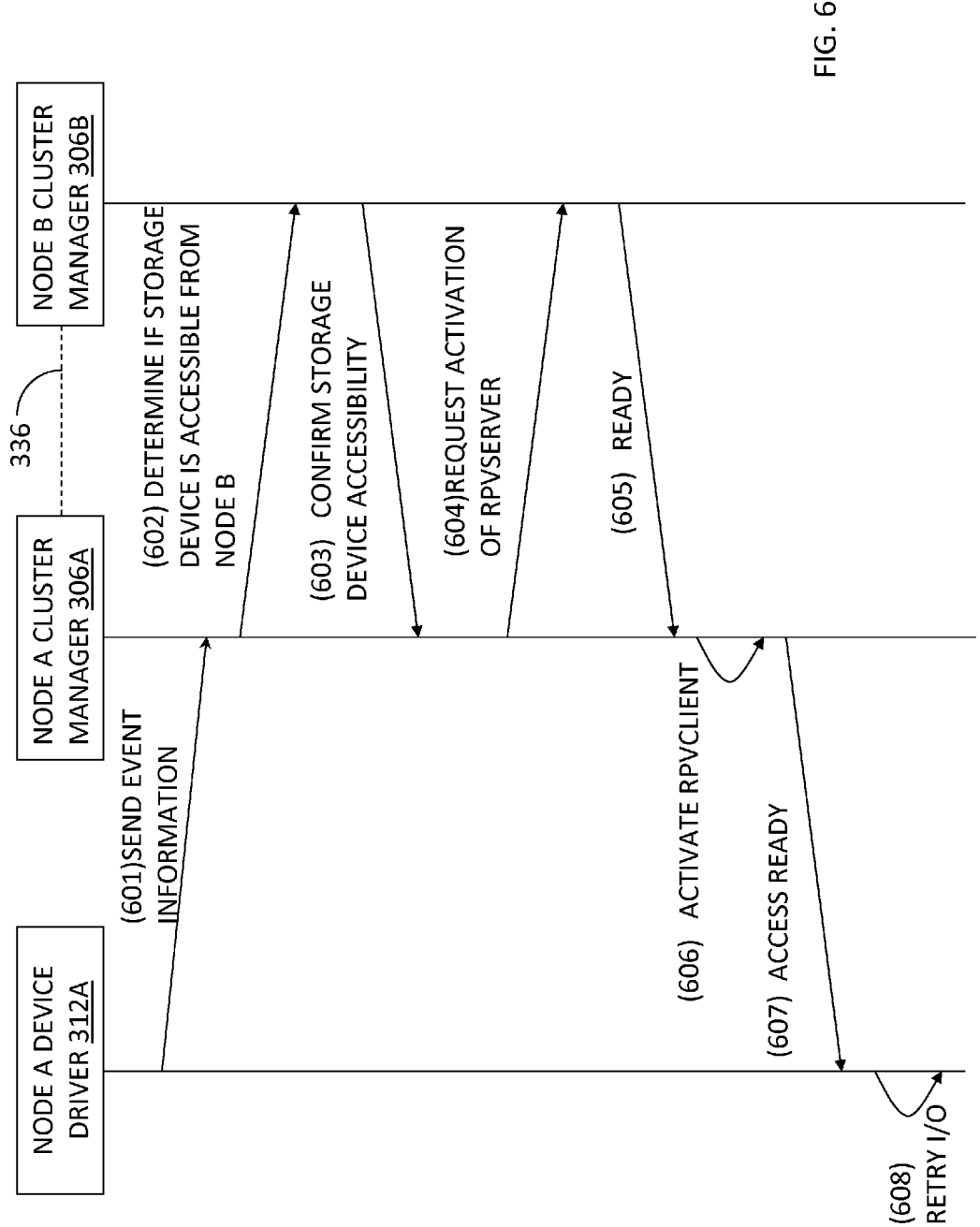
FIG. 6 is a schematic block diagram illustrating a method for establishing an alternative data path to a storage device in a high availability node cluster configuration, in accordance with an embodiment.

FIG. 6 is a schematic block diagram illustrating a method 600 for establishing an alternative data path to a storage device in a high availability node cluster configuration, in accordance with an embodiment. In describing the process flow 600, reference is also made to FIG. 3. Some or all of the process flow 600 can be applied to a high availability storage system, for example, PowerHA® provided by IBM, Inc. The method 600 can be governed by instructions that are stored in the memory device 304A of the first node server 300A, referred to as Node A, and/or the memory device 304B of the second node server 300B, referred to as Node B, and are executed by the processor 302A of Node A and or the processor 302B of Node B.

An event indicator can be output (601) from the Node A device driver 312A to the Node A cluster manager 306A. The event indicator can include event information related to a disk failure, an access path failure such as an FC link failure, and the like. The event information can include indicators of failures at access paths 324, 326 between Node A and the storage device 330. The event information can also indicate that the storage device 330 is operational, for example, the applications thereon are functional and accessible via other connections to the storage device 330, for example, via an IP network. In a preferred embodiment, the storage device 330 is configured as an IP-accessible device. If not, then Node A can ignore the event and activate a process that performs an application failover to Node B, for example, shown in FIG. 2. When configured as an IP-accessible device, and prior to outputting the event information, the device driver 312A can suspend I/O communications at the storage device 330 for a predetermined amount of time, for example, until the device driver 312A receives a ready message (607) from the Node A cluster manager 306A.

The Node A cluster manager 306A can send a query to the Node B cluster manager 306B to determine (602) whether the storage device 330 is accessible from Node B, for example, via network connector 316B and/or 318B. The query can include storage device information such as PVID, LUN ID, and the like.

The Node B cluster manager 306B can confirm (603) in response to the query whether Node B can access the storage device 330. The Node A cluster manager 306A can send a request (604) to the Node B cluster manager 306B to activate the RPV server 314B. A kernel extension can be started as described herein. Upon activation of the RPV server 314B, the Node B cluster manager 306B can send a reply to the Node A cluster manager 306A, indicating that Node B is ready (605) to receive requests for access to the storage device 330. The Node A cluster manager 306A can activate (606) the RPV client 314A. Since the disk is configured as IP enabled disk, using a command cluster manager activates the RPV client 314A. The Node A cluster manager 306A can send an access ready message (607) to the device driver 312A indicating that the storage device 330 can resume I/O operations via an IP connection 340 between Node A and Node B, and via an access path 338 from Node B to the storage device 330. In response to the access ready message, the device driver 312A can perform an I/O retry (608), whereby I/O can be resumed on the storage device 330 along a new data path, i.e., alternative data path 332 formed between Node A, Node B, and the storage device 330.

Figure 7:
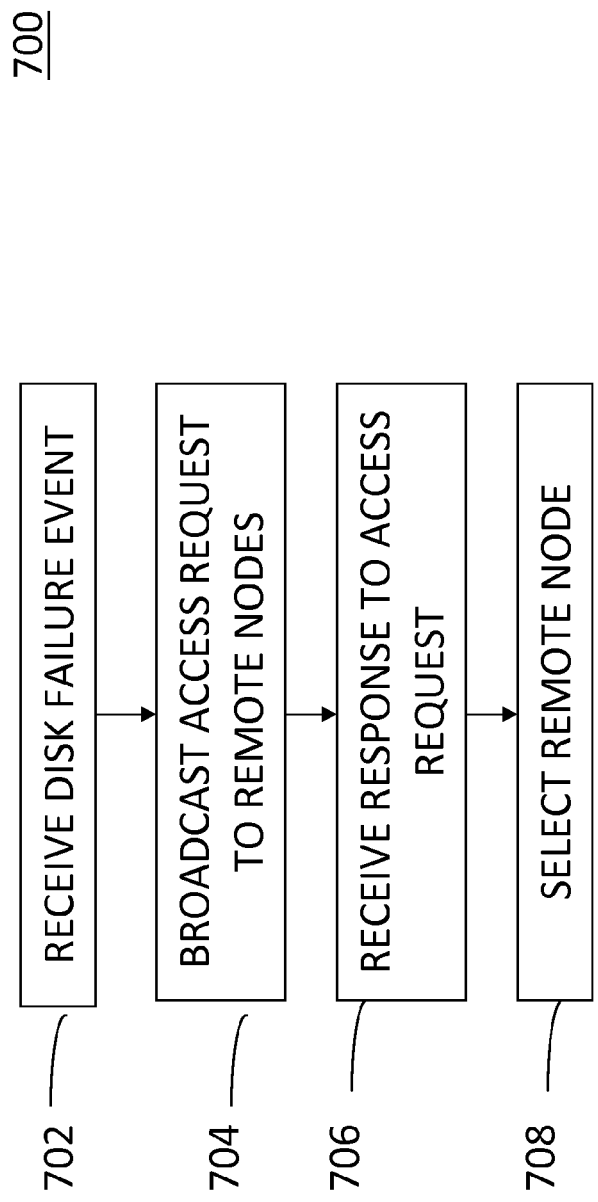
FIG. 7 is a flowchart illustrating a method for selecting a node in a high availability node cluster configuration for providing an alternative data path to a storage device, in accordance with an embodiment.

FIG. 7 is a flowchart illustrating a method 700 for selecting a node in a high availability node cluster configuration for providing an alternative data path to a storage device, in accordance with an embodiment. In describing the method 700, reference is also made to FIG. 3. Some or all of the process flow 600 can be applied to a high availability storage system, for example, PowerHA® provided by IBM, Inc. The method 700 can be governed by instructions that are stored in the memory device 304A of Node A, and/or the memory device of one or more other nodes in the node cluster, for example, Node B, and are executed by the processor 302A of Node A and or the processor of one or more other nodes in the node cluster, for example, Node B. Method 700 is preferably applied in a node cluster that includes three or more nodes.

At block 702, Node A receives a disk failure event, an access path failure such as an FC link failure, and the like, for example, described herein.

At block 704, the Node A cluster manager broadcasts a message to all other nodes in the cluster requesting that each node identifies itself and indicates whether it can communicate with the storage device 330. The request can include other information such as PVID, LUN ID, and the like.

At block 706, Node A receives a response from at least one other node in the cluster, for example, Node B. The responding node can indicate whether it can access the disk. The response can include other information such as CPU, free memory, and the like.

At block 708, Node A can select a node of the plurality of cluster nodes according to one or more different user criteria. For example, Node A can select a node according to resource availability, such as memory, CPU, load, and the like. In another example, Node A can select a node depending on the load on the network to reach the node, which can affect data throughout, access speed, and the like. In another example, Node A can select a node depending on the static priority of the nodes. In another example, Node A can select a node depending on the number of redundant access elements are provided, for example, Ethernet adaptors or FC adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method of accessing a storage device from a node when a local connection failure occurs between the node and the storage device, comprising:
    determining that a failure has occurred at a first node access path between a first node and a storage device that prevents an application at the first node from accessing the storage device from the first node access path;
    sending an access request from the first node to a second node, the access request initiated according to a geographic logical volume manager (GLUM) to delay or prevent the application from failing over to the second node, the second node having a second node access path to the storage device;
    determining that the second node can communicate with the storage device; and
    accessing the storage device by the application at the first node via the second node access path.

2. The computer-implemented method of claim 1, wherein accessing the storage device from the second node in response to the access request comprises:
    activating a remote physical volume (RPV) server at the second node;
    activating an RPV client at the first node;
    configuring the RPV client to receive I/O requests when the failure occurs at the first node access path.

3. The computer-implemented method of claim 2, further comprising:
    forming an alternative data path between the application of the first node and the storage device, the alternative data path including the second node access path; and
    exchanging the data along the alternative data path.

4. The computer-implemented method of claim 3, wherein information related to the alternative data path is added to an MPIO path list.

5. The computer-implemented method of claim 3, wherein the alternative data path is formed by a disk device driver of the first node.

6. The computer-implemented method of claim 2, wherein an I/O request is directed to the RPV client, which communicates the I/O request to the RPV server, and wherein in response the RPV server performs an I/O operation related to the storage device.

7. The computer-implemented method of claim 1, wherein the first node access path and the second node access path includes storage area network (SAN) connections.

8. The computer-implemented method of claim 1, wherein sending the access request includes sending the access request by the geographic logical volume manager (GLUM).

9. The computer-implemented method of claim 1, further comprising configuring the first node and the second node as a node cluster.

10. The computer-implemented method of claim 9, further comprising preventing an application failover from the first node to the second node.

11. The computer-implemented method of claim 1, further comprising:
    broadcasting the access request from the first node to at least two other nodes, the at least two other nodes including the second node;
    receiving a response from the second node that the second node can access the storage device; and
    selecting the second node for accessing the storage device according to one or more user criteria.

12. A computer-implemented method for redirecting data flow to an access path between a node and a storage device, comprising:
    forming a data path redirection module on a first node;
    forming a data path redirection receiver on a second node;
    configuring the data path redirection module with access information related to a storage device; and
    establishing an alternative data path between the first node, the second node, and the storage device according to the access information so that an application at the first node can exchange data with the storage device via the second node, the access information provided according to a geographic logical volume manager (GLUM) to delay or prevent the application from failing over to the second node.

13. The computer-implemented method of claim 12, wherein the data path redirection module includes a remote physical volume (RPV) client and the data path redirection module includes an RPV server.

14. The computer-implemented method of claim 12 further comprising:
    determining an access path failure between the first node and the storage device;
    verifying that the second node can access the storage device; and
    activating the data path redirection module and the data path redirection receiver to direct data along the alternative data path.

15. The computer-implemented method of claim 12, wherein the alternative data path includes a storage area network (SAN) connection between the second node and the storage device.

16. The computer-implemented method of claim 12, wherein the access information is sent by a geographic logical volume manager (GLUM).

17. A storage system comprising:
- a first node including a data path redirection module and an application;
- a second node including a data path redirection receiver;
- a storage device in communication with at least one of the first node and the second node;
- a primary data path between the first node and the storage device; and
- an alternative data path between the first node, the second node, and the storage device, wherein data is exchanged between the application at the first node and the storage device along the alternative data path in response to a failure at the primary data path, and according to a geographic logical volume manager (GLUM) that delays or prevents the application from failing over to the second node.

18. The storage system of claim 17, wherein the data path redirection module includes a remote physical volume (RPV) client and the data path redirection module includes an RPV server.

19. The storage system of claim 18, wherein each of the first and second nodes includes a cluster manager, the cluster managers of the first and second nodes communicating with each other to activate the RPV client and the RPV server for accessing the storage device from the application of the first node via the alternative data path.

20. A computer program product for accessing a storage device from a node when a local connection failure occurs between the node and the storage device, the computer program product comprising:
- a non-transitory computer readable storage medium having computer readable program code embodied therewith, the computer readable program code comprising;
  - computer readable program code configured to determine that a failure has occurred at a first node access path between a first node and a storage device that prevents an application at the first node from accessing the storage device from the first node access path;
  - computer readable program code configured to an access request from the first node to a second node, the second node having a second node access path to the storage device, the access request initiated according to a geographic logical volume manager (GLUM) to delay or prevent the application from failing over to the second node;
  - computer readable program code configured to determine that the second node can communicate with the storage device; and
  - computer readable program code configured to access the storage device by an application at the first node via the second node access path.

* * * * *